Patented May 22, 1951

2,554,245

UNITED STATES PATENT OFFICE 2,554,245

COMPLEX FRIEDEL-CRAFTS CATALYST CONTAINING AROMATIC HYDROCARBONS

Ralph W. Dornte, Westfield, N. J., assignor to Standard Oil Development Company, a corporation of Delaware No Drawing. Application September 17, 1946, Serial No. 697,581

8 Claims. (Cl. 260—85.3)

This invention relates to low temperature olefinic polymerization processes; relates particularly to polymerization by composite Friedel-Crafts type catalysts, and relates especially to polymerization by the use of Friedel-Crafts catalyst substances combined with aromatic substances.

It has been found possible to polymerize olefinic material, especially isobutylene, or isobutylene mixed with a multiolefin having from 4 to 14 carbon atoms per molecule; by the application thereto of a Friedel-Crafts catalyst, preferably in solution in a low-freezing, non-complex-forming solvent such as aluminum chloride in solution in ethyl or methyl chloride or the like, or boron trifluoride in solution in liquid ethane, or in ethyl chloride, or the like, to produce a variety of very valuable polymers. Difficulty has been encountered, however, in the control of the reaction, and in the control of the properties of the resulting polymer.

It is now found that by the use of a Friedel-Crafts catalyst combined with or compounded with an aromatic substance, markedly superior products are obtained.

The preferred catalyst compounding agents are such substances as benzene, toluene, the various xylenes, and a wide range of aromatic compounds containing the benzene ring, either singly or plurally in each molecule. Other representative substances are diphenyl methane, triphenyl methane, the various diphenyl ethanes, diphenyl per se, the various naphthalenes, and the like. That is, the secondary substance, composited with the Friedel-Crafts catalyst before or in the forming of the solution, is an aryl substance broadly, including not only the aryl substances as such, but the aralkanes, the alkylated aromatics such as the methyl naphthalenes and also the polynuclear aromatic compounds such as terphenyl, anthracene, phenanthrene and pyrene as well as their alkyl derivatives.

In some instances the amount of aromatic compound required is a small proportion of the amount of Friedel-Crafts catalyst substance or the aromatic compound may have a mol ratio of 1–10 to the metal halide. In other instances the aromatic compound may form not only a composite but also may be the catalyst solvent as well.

Thus the process of the invention polymerizes an isoolefinic mixture such as isobutylene or other isoolefin having from 4 to about 20 carbon atoms per molecule, alone, or in admixture with a multiolefin having from 4 to about 14 carbon atoms per molecule, such as butadiene, isoprene, chloroprene, dimethyl butadiene, myrcene, allo ocymene, dimethallyl, the ethers of butadiene, the ethers of propylene, the vinyl halides including vinyl chloride, vinyl bromide and the like. For other types of reactions, styrene and the octene known as dimer, or diisobutylene are both particularly useful. The invention is practised by cooling the mixture to temperatures within the range between 0° C. and —164° C.; preferably within the range between —35° C. or —40° C. and —103° C. by the application thereto of a Friedel-Crafts metal halide-containing catalyst together with an aromtic or benzene ring-containing substance to yield a polymer which is preferably a solid with a molecular weight ranging from 20,000 to 500,000, capable (when it is a copolymer) of a curing reaction with sulfur to yield a material of high elongation and good tensile strength, or by special treatment, a material either of simple polyisobutylene or a copolymer containing the multiolefin having a molecular weight within the range between about 1000 and 20,000, the simple polymers of isobutylene not being curable and the copolymers having molecular weights below about 20,000, also not being curable. Other objects and details of the invention will be apparent from the following description:

The raw materials upon which the catalyst operates are olefinic in nature. Broadly, the more important raw material is an isoolefin which for some purposes preferably is isobutylene because of its markedly superior polymerization properties. Alternatively, other isoolefins such as the isopentenes, the isohexenes, the isoheptenes, and the isooctenes, are usable, and for specific purposes the normal olefins from 3 to 20 inclusive carbon atoms are useful. These mono olefins may be polymerized alone, but with the exception of isobutylene, the resulting polymers are usually too low in molecular weight to be of outstanding value. Preferably, the olefinic material is a mixture in which either isobutylene or a multiolefin predominates.

A very valuable elastomer is readily prepared from isobutylene in major proportion with a multiolefin in minor proportion. The multiolefin may be any compound containing more than one double linkage, and more than 3 carbon atoms without regard to the presence of other substituents and without regard to the position of the double linkages. Thus, a very valuable multiolefinic copolymerizate is isoprene which, for the making of an elastomer, is preferred. Just about as satisfactory elastomers are obtainable from butadiene, piperylene, the various dimethyl butadienes, myrcene, which is a triolefin, alloocymene, which is another tri-olefin, dimethallyl which is a non-conjugated diolefin, the butadiene-methyl, -ethyl or -propyl ethers, which are representative of a wide range of diolefinic compound ethers; compound ethers up to about 20 carbon atoms per molecule being highly useful. Similarly, the simple ethers of the mono olefins are also useful including allyl ether, methallyl ether and the like.

For certain purposes, substituted multi-enes such as chloroprene, are also useful; the chloroprene being representative of all of the chlorine-substituted multiolefinic substances.

For still other processes, the raw materials consist of relatively large proportions of dienes with the remainder of the mixture a more difficultly polymerizable mono-olefin such as propylene, the normal butenes, all of the pentenes, hexenes, heptenes, octenes, and the like, up to about 20 carbon atoms. These materials in which a relatively high proportion of multi-enes, with some other mono-olefin than isobutylene, yield non-elastomers which are resins more like amber in physical properties than like rubber.

The materials are all cooled below room temperature. For the production of an elastomer, the preferred temperature of reaction is within the range between about −40° C. to −103° C. This reduction in temperature may be obtained by the use of refrigerating jackets upon the storage, mixing and polymerizing equipment, such substances as liquid propane, liquid sulfur dioxide, liquid ammonia, liquid carbon dioxide, liquid ethane, and liquid ethylene being particularly suitable. Alternatively, a direct or internal refrigerant may be used; such substances as liquid propane, liquid or solid carbon dioxide, liquid ethane, liquid ethylene, and even, on occasion, liquid methane, admixed directly with the olefinic material being particularly satisfactory.

Also various diluents may be mixed with the olefinic material, such substances as liquid pentane, liquid butane, liquid propane (at temperatures lower than −40° C.), liquid ethyl chloride, methyl chloride, chloroform, methylene dichloride, ethylene dichloride, carbon disulfide, and the like being particularly useful as diluents when the polymerization temperature is below their boiling points.

For the non-elastomer material, a slightly higher temperature is usable, temperatures within the range between +10° C. and −30° C. to −35° C. being particularly useful and the same external and internal refrigerants and diluents are similarly usable.

The catalyst in which the essence of the present invention lies is a composite catalyst containing a non-gaseous Friedel-Crafts catalyst and an aromatic compound. For the active metal halide Friedel-Crafts catalyst, other than $BF_3$, any of the Friedel-Crafts active metal halide substances disclosed by N. O. Calloway in his article on "The Friedel-Crafts synthesis" printed in the issue of "Chemical Reviews," published for the American Chemical Society at Baltimore, in 1935, in volume XVII, No. 3, the article beginning on page 327, the list being particularly well shown on page 375, may be used. Of the list shown by Calloway, the preferred substances are aluminum chloride and titanium tetrachloride. For some reactions, uranium halides are useful, and for some reactions, modified halides such as aluminum ethoxy chloride or aluminum chlorobromide are also useful.

The active metal halide catalyst is used in the presence of an aromatic compound for which purpose such substances as benzene, toluene, the various xylenes, the various naphthalenes, and the like, as above listed, are particularly useful.

Some of the resulting compounds are liquid, both at room temperature and at the polymerization temperature, and they may be used directly by rapid admixture into the polymerizable olefinic material. Most of the compounds are however preferably used in solution in a low boiling non-complex-forming solvent. For the purposes of this application, the solvent is defined as low-freezing when it has a freezing point below 0° C., and as non-complex-forming when there does not separate from the solution, upon evaporation of the solvent, a compound between the solvent and the Friedel-Crafts catalyst; or when the addition of the solvent in the form of a vapor to the catalyst at constant temperature leads to a substantially continuous change in the composition of the catalyst phase and to a continuous increase in the partial pressure of the solvent; in general, the catalyst substance being then recoverable unchanged by removal of the solvent.

For the solvent, depending upon the solubility properties of the mixture of Friedel-Crafts active metal halide and aromatic compound, alkyl chlorides of 1 to 2 carbon atoms, namely: ethyl or methyl chloride, as well as ethylene dichloride, chloroform, and the like are particularly useful, any of the mono or poly halogen-substituted aliphatic compounds which have freezing points below 0° C. being particularly useful since they are adequate solvents for practically all of the Friedel-Crafts active metal halide mixtures with aromatic compounds. For the purposes of this application, any saturated linear chain or aliphatic compound containing one or more halogen substituent is defined as "an alkyl halide" without regard to the number of halogen substituents. Alternatively, with some of the catalyst compositions, such solvents as carbon disulfide and the lower boiling saturated petroleum hydrocarbons are also useful. In some instances also, a single aromatic compound may serve both as catalyst modifying agent and as catalyst solvent; toluene and benzene being particularly representative of this type of substances.

In the polymerization reaction proper, the cold olefinic material is rapidly stirred, and the catalyst is added in any desired way to the rapidly stirred olefinic material. A preferred method of addition is in the form of a small, high pressure jet of catalyst solution into the body of the cold, rapidly stirred polymerizate. Alternatively, with a limited number of the compound catalysts, the catalyst may be applied in the form of a fine spray onto the surface of the rapidly stirred, cold, olefinic material; this latter procedure being, however, less desirable when butadiene is present, or when a major proportion of multiolefin is present, since it tends to polymerize some of the diolefinic vapor above the surface of the cold liquid. The resulting polymer may be a more or less viscous liquid, or a curable elastomer, or a heat-bodyable or curable, relatively non-elastic resin, according to the olefin or olefins chosen, and the character and proportion of the mixture used, as well as the character of the catalyst.

A series of representative aromatic compounds and the suitable molecular ratio between the aromatic compounds and three representative Friedel-Crafts catalysts is shown in the following Table 1:

TABLE 1

|  | Mol Ratio | | | | | |
|---|---|---|---|---|---|---|
|  | $AlCl_3$ | | $TiCl_4$ | | $BF_3$ | |
| Benzene | Excess | Active | Excess | Active | Excess | Inactive |
| Toluene | do | do | do | do | do | Do. |
| Xylene | do | do | do | do | do | Do. |
| Diphenyl methane | 1.0 | do | 1.3 | do | Excess | Inactive. |
|  | 10.0 | do | Excess | do |  |  |
|  | Excess | do |  |  |  |  |
| Triphenyl methane | 1.0 | Active | 7.7 | do |  |  |
|  | 10.0 | do |  |  |  |  |
|  | 1.0 | do |  |  |  |  |
| 1,1 Diphenylethane | 10.0 | do | 1.2 | do | Excess | Inactive. |
|  |  |  | 12 | do |  |  |
| 1,2 Diphenylethane | 1.0 | Active | 0.6 | Active |  |  |
|  | 10.0 | do |  |  |  |  |
| Diphenyl | 24 | do | 1.4 | do |  |  |
|  |  |  | 7 | do |  |  |
| Naphthalene | Excess | do |  |  |  |  |

The resulting polymers may be grouped in three classes. With the simple isoolefins other than isobutylene, and with isobutylene at temperatures between about −10 and about +10, the polymer obtained is a more or less viscous liquid ranging from dimer or trimer up to the very heavy oily material or semi-solid, sticky, material having molecular weights below 20,000. This material is particularly useful as an addition agent or thicknener in lubricating oil and as a softener for rubber substances or a component of paints, varnishes and enamels. With simple isobutylene, and a moderately low temperature ranging from −40° C. down, a polymer having a molecular weight within the range between about 20,000 and 500,000 is obtained. This polymer is less satisfactory for a lubricant addition agent because of its lower resistance to mechanical breakdown, but it is a highly valuable addition agent with rubber and the synthetic elastomers in which it markedly improves the curing properties and the physical properties generally of the elastomer, although it is without elasticity or curability itself.

The polymers of isobutylene in major proportion with a multiolefin in minor proportion, especially those prepared at temperatures within the range between −40° C. and −103° C. are curable elastomers which have iodine numbers within the range between about 0.5 and 50, preferably within the range between 0.5 and 8 or 10. They are reactive with sulfur in a curing reaction, especially in the presence of a sulfurization aid such as tetra methyl thiuram disulfide (Tuads) or similar organic sulfur compounds, somewhat analogous to the vulcanization of rubber, and are reactive with the para quinone dioxime substances including the esters, metal salts, homologs and analogs; and reactive with all of the dinitroso compounds in similar curing reactions to yield solid, cured elastomers having tensile strengths ranging from 1000 to 4500 pounds per square inch and elongations at break ranging from 500% to 1200%. The third group of polymers, prepared at temperatures between +10° C. and −35° C., using substantial proportions to major proportions of the multiolefin with other olefins than isobutylene are hard, resin types of substances, not elastomers, which show iodine numbers ranging from 50 or 60 up to about 300. These resins are oil soluble, both in hydrocarbon oils and the drying oils, paint oils, and the like and they can be heat bodied, either alone or in oil solution. These resins are excellent paint, varnish and enamel resins and are excellent molding composition resins yielding solids of good strength, low brittleness and excellent physical properties.

EXAMPLE 1

A series of polymerizations were conducted with external ethylene refrigeration on various mixtures of isobutylene using for a catalyst a solution of $Al_2Cl_6 \cdot 6C_6H_5CH_3$ in methyl chloride with an equivalent aluminum chloride concentration in the range 0.15–0.30 g. $AlCl_3/100$ cc. $CH_3Cl$ as indicated in the third column of Table 2. The polymerizations and results are shown in Tables 2 and 3, where the first column gives the experiment number and the second shows the polymerization feed. In this column B–0 indicates a polymerizate of wholly isobutylene and a methyl chloride diluent in the volume ratio of 3:1. This diluent ratio is employed in all cases unless the diluent and diluent ratio is specified as in exp. No. 19. B–3 means a polymerizate mixture containing 97% isobutylene of approximately 99% purity and 3% isoprene of approximately 96% purity. B–8 indicates a polymerizate mixture consisting of about 92% of the same purity of isobutylene, with 8% of the same isoprene. A–10 indicates 90% of the same isobutylene and 10% of butadiene of good purity. S–60 indicates a feed containing 60% styrene and 40% isobutylene with a 3:1 diluent ratio of methyl chloride on volume basis. The third column shows the catalyst concentration. The fourth column indicates the percent polymerization of the total amount of unsaturates in the original polymerizate. The fifth column shows the catalytic efficiency of the catalyst. The sixth column shows the unsaturation. The seventh column shows the amount of low molecular weight polymer present, i. e., molecular weight less than 16,000 (Staudinger). The eighth column shows the intrinsic viscosity of the polymer in diisobutylene solution. The ninth and tenth columns show the Staudinger molecular weight numbers and the viscosity average molecular weight. The eleventh column shows the Mooney viscosity of the polymer ob-

TABLE 2

*Polymerizations by the complex catalyst $Al_2Cl_6.6C_6H_5CH_3$ at $-102°$ C.*

| No. | Feed | Catalyst Soln. Concn. g. AlCl₃ Per 100 cc. CH₃Cl | Conv. wt., Per Cent | Cat. Eff. g. polymer Per g. AlCl₃ | Unsat. (ICl) Mol., Per Cent | Low Polymer, wt. Per Cent | Int. Vis. | Mol. wt.×10⁻³ Staud. | Mol. wt.×10⁻³ Vis. Average | Mooney Viscosity 100° C. 8 min. |
|---|---|---|---|---|---|---|---|---|---|---|
| 1 | B-0 | 0.30 | 15 | 220 | | 24.5 | 2.25 | 71 | 930 | |
| 14 | do | .15 | 91 | 950 | 0.31 | 9.0 | 3.96 | 124 | 2,250 | |
| 7 | B-0 Control | .20 | 34 | 560 | | | 4.10 | 130 | 2,400 | |
| 10 | B-3 | .30 | 36 | 460 | 1.49 | 26.5 | 1.05 | 33 | 285 | 31 |
| 9 | B-3 | .30 | 88 | 540 | 1.49 | 31.8 | .96 | 30 | 250 | 25 |
| 3 | B-3 | .30 | 90 | 270 | 1.77 | 33.6 | .90 | 28 | 220 | 22 |
| 2 | B-3 | .30 | 93 | 250 | 1.85 | 34.5 | .90 | 28 | 220 | 20 |
| 7 | B-3 | .30 | 97 | 970 | 1.65 | 46.7 | .74 | 23 | 165 | 17 |
| 8 | B-3 | .30 | 97 | 1,330 | 1.65 | 39.5 | .74 | 23 | 165 | 13 |
| 15 | B-3 | .15 | 89 | 380 | 1.86 | 37.9 | .92 | 29 | 230 | 23 |
| 18 | B-3 non-diluent | .15 | 11 | 1,500 | 2.25 | | Insoluble | | | 100 |
| 19 | B-3 1:1 C₄H₁₀ diluent | .15 | 36 | 1,500 | 2.13 | 23.5 | .93 | 29 | 230 | 23 |
| 4 | B-3 Control | .20 | 31 | 350 | 1.49 | | 1.62 | 51 | 570 | 79 |
| 2 | Control non-diluent | .20 | 16 | 1,560 | 2.45 | | 1.43 | 45 | 460 | 78 |
| 1 | Control 1:1 C₄H₁₀ diluent | .20 | 35 | 700 | 1.69 | | 2.05 | 64 | 810 | 85 |
| 12 | B-8 | .30 | 31 | 380 | 3.62 | 49.3 | .77 | 24 | 175 | 17 |
| 11 | do | .30 | 84 | 510 | 4.64 | 58.7 | .73 | 23 | 160 | 3 |
| 16 | do | .15 | 86 | 270 | 4.35 | 70.8 | .64 | 20 | 130 | 8 |
| 4 | do | .30 | 90 | 220 | 4.53 | 60.3 | .14 | 1 | 12 | 10 |
| 5 | do | 0.30 | 96 | 180 | 4.97 | 57.5 | 0.70 | 22 | 150 | 13 |
| 5 | B-8 Control | .20 | 73 | 320 | 1.74 | | .87 | 27 | 215 | 29 |
| 13 | A-10 | .30 | 23 | 280 | 1.07 | 25.2 | 1.40 | 44 | 450 | |
| 17 | do | .15 | 98 | 360 | 0.84 | 19.4 | 1.72 | 54 | 620 | 48 |
| 6 | A-10 Control | .20 | 89 | 460 | .42 | | 1.90 | 60 | 720 | 66 |
| 6 | S-60 | .30 | 100 | 200 | | | 0.61 | | | |
| 3 | S-60 Control | .20 | 100 | 670 | | | .71 | | | |

Diluent ratio 3:1 CH₃Cl unless specified.

TABLE 3

[Tensile, 300% Modulus, Elongation 307° F.]

| No. | Parts Carbon Black | 20' | 40' | 60' | 80' |
|---|---|---|---|---|---|
| 10 | 50 | 2400— 360—850 | 2600— 570—750 | | 2600— 780—650 |
| 9 | 50 | 2300— 380—900 | 2500— 690—700 | 2500— 840—700 | 2500— 910—600 |
|   | 10 | 2100     800 | 1700     700 | | 1600     550 |
| 3 | 50 | 2000— 280—850 | 2400— 570—800 | 2500— 700—750 | 2500— 700—700 |
|   | 10 | 1900     850 | 1700     750 | | 1300     600 |
| 2 | 50 | 1900— 290—900 | 2200— 480—800 | 2400— 650—700 | 2400— 730—700 |
|   | 10 | 1300     850 | 1900     800 | | 1400     650 |
| 7 | 50 | 1400— 310—800 | 1600— 520—700 | 1800— 650—650 | 1870— 810—600 |
|   | 10 | 600     800 | 700     600 | | 600     500 |
| 8 | 50 | 1300— 250—850 | 1700— 430—800 | 1900— 570—700 | 1900— 650—700 |
|   | 10 | 1100     850 | 1200     700 | | 600     500 |
| 15 | 50 | 2500— 470—850 | 2800— 670—700 | 2800— 810—700 | 2800— 930—700 |
|   | 10 | 2300     950 | 2200     750 | 1100     500 | |
| 18 | 50 | 3200— 860—700 | 3100—1310—550 | | 2800—1620—450 |
|   | 10 | 500     350 | 500     300 | 500     230 | 500     230 |
| 19 | 50 | 2500— 490—800 | 2500— 690—650 | 2700— 940—650 | 2600—1070—600 |
|   | 10 | 2300     900 | 2100     750 | | |
| 4 | 50 | 3200— 530—800 | 3300— 790—700 | 3300— 890—650 | 3300— 890—650 |
| 2 | 50 | 3100— 690—800 | 3100— 990—650 | 3000—1100—600 | 2900—1110—600 |
|   | 10 | 2900     750 | 1200     550 | 800     400 | 800     400 |
| 1 | 50 | 3000— 400—850 | 3200— 640—750 | 3200— 800—700 | 3200— 890—650 |
|   | 10 | 3700     800 | 3600     700 | 3100     700 | 3100     600 |
| 12 | 50 | 2500—1020—600 | 2400—1390—450 | | |
| 11 | 50 | 2400— 980—600 | 2300—1510—400 | 2200—1740—400 | 2200—1760—400 |
|   | 10 | 800     450 | 600     300 | | |
| 16 | 50 | 2200—1020—550 | 2200—1480—400 | 2100—1620—350 | 2000—1670—350 |
|   | 10 | 600     450 | 400     300 | | |
| 4 | 50 | 1800— 770—650 | 2000—1260—450 | 1900—1460—400 | 1800—1480—350 |
|   | 10 | 500     300 | 400     300 | | 400     350 |
| 5 | 50 | 2100— 930—600 | 2000—1350—400 | 2000—1620—400 | 2000—1600—350 |
|   | 10 | 800     550 | 600     400 | | 700     400 |
| 5 | 50 | 2600—1050—600 | 2500—1460—450 | 2500—1700—400 | 2400—1730—400 |
| 13 | | | | | |
| 17 | 50 | 400— 90—900 | 600— 100—800 | 1200— 160—950 | 1200— 150—950 |
|   | 10 | 300    1100 | 500     950 | | 500     850 |
| 6 | 50 | 700— 150—850 | 1400— 160—900 | 1500— 250—850 | 2000— 260—800 | tained. In Table 3, the first column shows the polymerization run number; the second column shows the carbon black in a standard compounding formula; and the remaining columns show the tensile strength, modulus and elongation at break of a polymer cured for 20, 40, 60 and 80 minutes at 307° F. The polymer was compounded according to the following recipe:

|  | Parts |
|---|---|
| Polymer | 100 |
| Zinc oxide | 5 |
| Stearic acid | 3 |
| Carbon black | 10 or 50 |
| Sulfur | 1.5 to 2 |
| Tuads (tetramethyl thiuram disulfide) | 1 |
| Captax (mercapto benzothiazole) | 0 to 0.5 |

These results show the very substantial gain in modulus with minor sacrifice of tensile strength obtainable in the cured vulcanizate prepared with a catalyst of the present invention.

EXAMPLE 2

A feed containing equal volumes of isobutylene and methyl chloride was polymerized at −23° C. by a solution of titanium tetrachloride in toluene (0.9 g. $TiCl_4$/100 cc.). The polymerization mixture was refrigerated by cooling with boiling methyl chloride. The product formed had a Staudinger molecular weight of 21,000 which is excellent for the conditions employed.

EXAMPLE 3

About 100 cc. of methyl chloride was saturated with naphthalene and 1 g. of aluminum chloride was added which dissolved rapidly to form a dark red solution. This catalyst solution was active in the polymerization of isobutylene producing rather soft polymers at 0° C.

EXAMPLE 4

The catalyst solution of Example 3 was evaporated to dryness yielding a very dark nearly black solid which was readily soluble in toluene to form a catalyst solution which was very active in the polymerization of isobutylene. In one polymerization with this catalyst solution a feed of equal volumes of isobutylene and toluene was polymerized at +10° C. The reaction was so vigorous that the temperature rose to 25° C. and a very viscous oil was formed.

EXAMPLE 5

A complex catalyst solution of aluminum chloride and o-xylene was prepared by dissolving 1 g. $AlCl_3$ in 100 cc. of $(CH_3)_2C_6H_4$. The solution rate was accelerated by heating to about 50° C. A yellow solution is formed on a small amount of a heavy oil phase which was filtered off. This catalyst solution polymerized isobutylene very vigorously in the temperature interval −78 to 0° C.

EXAMPLE 6

A titanium tetrachloride complex catalyst solution was prepared by dissolving 1.7 g. $TiCl_4$ in 100 cc. of ortho xylene. This catalyst solution was active in polymerizing isobutylene at temperatures in the range −78 to 25° C.

EXAMPLE 7

Catalyst solutions containing 0.08 g. $AlCl_3$ per 100 cc. $CH_3Cl$ were prepared with a triphenyl methane-aluminum chloride mol ratio of 1 and 10. These solutions were active in the polymerization of isobutylene, isoprene and styrene at 1:1 dilution with methyl chloride and at temperatures −78° to −23° C. The polyisoprene formed was a soluble rubbery polymer

EXAMPLE 8

A solution of 0.1 g. of aluminum chloride in benzene produced an oil from isobutylene at −23° C. and a soluble rubbery polymer from isoprene at −23° C. when these monomers were diluted 1:1 with methyl chloride. This catalyst polymerized styrene in mass at 20° C. A solution of 0.2 g. of titanium tetrachloride in benzene gave similar polymerization results.

Thus the invention relates to a catalyst consisting of a compound of a Friedel-Crafts active metal halide catalyst and a liquid aromatic compound, and the use of that catalyst in the polymerization of olefinic material at low temperature to yield a superior control of the polymerization reaction.

While there are above disclosed but a limited number of embodiments of the process and product of the invention, it is possible to produce still other embodiments without departing from the inventive concept herein disclosed and it is therefore desired that only such limitations be imposed on the appended claims as are stated therein or required by the prior art.

I claim:

1. In a polymerization process wherein an isobutylene-containing feed is cooled to a temperature between −40° C. and −164° C., the step of adding to the cooled feed a composite catalyst consisting of a non-gaseous active Friedel-Crafts metal halide in combination with 1 to 10 mole equivalents of an aromatic hydrocarbon free from olefinic unsaturation.

2. A process according to claim 1 wherein the Friedel-Crafts halide is aluminum chloride.

3. A process according to claim 2 wherein the aromatic hydrocarbon is toluene.

4. In a polymerization process wherein an isobutylene-containing feed is cooled to a temperature between −40° C. and −164° C., the step of adding to the cold feed a catalyst solution, in an alkyl chloride solvent of 1 to 2 carbon atoms, of a composite catalyst consisting of a non-gaseous active Friedel-Crafts metal halide in combination with 1 to 10 mole equivalents of an aromatic hydrocarbon free from olefinic unsaturation.

5. A process according to claim 4 wherein the Friedel-Crafts metal halide is titanium tetrachloride.

6. A process according to claim 4 wherein the Friedel-Crafts metal halide is aluminum bromide 7. A process for the production of elastomers which comprises the steps of cooling an isobutylene containing feed to a temperature between −40° C. and −103° C., and adding to the cold feed a catalyst solution consisting of an aluminum chloride-toluene complex having the formula $Al_2Cl_6 \cdot 6C_6H_5CH_3$ dissolved in methyl chloride in a concentration of 0.15 to 0.30 gram of aluminum chloride per 100 cc. of methyl chloride.

8. A process for the production of elastomers according to claim 7 wherein the feed contains a mixture of 100 parts of isobutylene and 3 parts of isoprene, and wherein the catalyst is added in an amount equivalent to 1 gram of aluminum chloride per 250 to 1500 grams of polymer produced.

RALPH W. DORNTE.

REFERENCES CITED

The following references are of record in the file of this patent:

UNITED STATES PATENTS

| Number | Name | Date |
| --- | --- | --- |
| 1,720,929 | Staudinger | July 16, 1929 |
| 1,982,707 | Thomas | Dec. 4, 1934 |
| 2,085,535 | Langedijk | June 29, 1937 |
| 2,092,295 | Van Peski | Sept. 7, 1937 |
| 2,142,980 | Huijser | Jan. 3, 1939 |
| 2,274,749 | Smyers | Mar. 3, 1942 |
| 2,291,416 | Sparks | July 28, 1942 |
| 2,436,767 | Gerlicher | Feb. 24, 1948 |